United States Patent Office 2,826,579
Patented Mar. 11, 1958

2,826,579

PROCESS FOR THE PRODUCTION OF MELAMINE

Marion D. Barnes and William P. Donahoo, El Dorado, Ark., assignors to Monsanto Chemical Company, St. Louis, Mo., a corporation of Delaware No Drawing. Application September 19, 1956
Serial No. 608,715

2 Claims. (Cl. 260—249.7)

This invention relates to melamine and more particularly to an improved process for the production thereof.

It is an object of this invention to provide an improved process for the production of melamine by the reaction of carbon monoxide, ammonia, sulfur dioxide and sulfur. This and other objects will become apparent from the description of the invention.

It has been discovered that good yields of melamine can be obtained by a simple one-step process which comprises reacting carbon monoxide, ammonia, sulfur dioxide and sulfur at elevated temperatures at superatmospheric pressures. The following example illustrates the invention:

Eight grams of sulfur were placed in a one-liter stainless steel Parr bomb. The bomb was closed and 96 grams of liquid sulfur dioxide were added through a tube. Liquid ammonia was then added to the bomb through a tube until a pressure of 350 p. s. i. g. was registered in the bomb. Ammonia was then bled off returning the bomb to atmospheric pressure. At substantially atmospheric pressure 18 grams of carbon monoxide were charged through a tube into the bomb. Liquid ammonia was then added to the bomb until a pressure at 350 p. s. i. g. was attained. The total amount of ammonia charged was 71 grams.

The sealed bomb was placed in a heater and the temperature raised to 320° C. in 48 minutes. A pressure of approximately 1100 p. s. i. g. developed in the bomb. The bomb was maintained at this temperature and pressure for approximately 20 minutes after which time it was cooled to room temperature in a water bath. The bomb was opened and a reaction product weighing 147 grams was removed. This reaction product was extracted at 100° C. with a 10% aqueous solution of sodium hydroxide which dissolved the melamine from the reaction mixture. The sodium hydroxide solution containing the melamine was then cooled to 0° C. precipitating the melamine. The melamine was filtered therefrom, washed with water and dried at 110° C. The melamine recovered represented a yield of 8.35% based upon carbon monoxide charged.

Substantial variations in the quantities of reactants and reaction conditions specified in the preceding example are possible without departing from the scope of this invention. The reaction may be represented by the following equation:

$$6CO + 24NH_3 + 9SO_2 + 3S \rightarrow 2C_3N_6H_6 + 6(NH_4)_2SO_4 + 6H_2S$$

In carrying out this process at least the stoichiometric proportion of carbon monoxide, sulfur dioxide and ammonia to sulfur for the reaction should be employed. Thus at least 2 molecular proportions of carbon monoxide, 3 molecular proportions of sulfur dioxide and 8 molecular proportions of ammonia, and preferably an excess of these quantities, should be employed for each 1 molecular proportion of sulfur. Excessive quantities of any of these reactants have no significant deleterious effect upon the reaction and as much as 500% excess of any reactant can be used if desired.

The superatmospheric pressure at which the reaction is carried out can be substantially varied. Preferably the reaction should be carried out at a pressure of at least 500 p. s. i. g. Pressures of 2000 p. s. i. g., or higher can be used if desired.

An elevated reaction temperature is necessary and should be maintained within the range of about 300° C. to about 400° C. and preferably temperature in the range of about 320° C. to 350° C. Higher temperatures can be used but care must be exercised to avoid decomposition at temperatures above those specified herein.

While the example illustrates a batch process, the process is easily adaptable to continuous processing techniques.

After the reaction is complete, melamine is recovered from the reaction by any of the convenient techniques well known to those skilled in the art. Aqueous extraction of the melamine from the reaction product at elevated temperatures is particularly convenient.

What is claimed:

1. A process for the production of melamine which comprises heating a mixture comprising sulfur, carbon monoxide, ammonia and $SO_2$ in the proportion of at least 2 molecular proportions of carbon monoxide, at least 8 molecular proportions of ammonia and at least 3 molecular proportions of sulfur dioxide for each molecular proportion of sulfur at a temperature within the range of from about 300° C. to 400° C. and at a pressure of at least 500 p. s. i. g.

2. A process for the production of melamine which comprises heating a mixture comprising sulfur, carbon monoxide, ammonia and $SO_2$ in the proportion of at least 2 molecular proportions of carbon monoxide, at least 8 molecular proportions of ammonia and at least 3 molecular proportions of sulfur dioxide for each molecular proportion of sulfur at a temperature within the range of from about 320° C. to 350° C. and at a pressure of at least 500 p. s. i. g.

References Cited in the file of this patent

UNITED STATES PATENTS

| 2,557,986 | Marsh | June 26, 1951 |
| 2,577,201 | Lane | Dec. 4, 1951 |

FOREIGN PATENTS

| 675,545 | Great Britain | July 9, 1952 |

OTHER REFERENCES

Marecek, Chemicky Obzor, vol. 23 (217–221).
Klemenc: Zeitschrift für Anorganische und Allegemeine Chemie, vol. 191, pages 246–82 (1930).

U. S. DEPARTMENT OF COMMERCE
PATENT OFFICE

CERTIFICATE OF CORRECTION

Patent No. 2,826,579    Marion D. Barnes et al.          March 11, 1958

It is hereby certified that error appears in the printed specification of the above numbered patent requiring correction and that the said Letters Patent should read as corrected below.

Column 2, line 15, after "of" insert --1000 p. s. i. g.,--.

Signed and sealed this 1st day of July 1958.

(SEAL)
Attest:

KARL H. AXLINE
Attesting Officer

ROBERT C. WATSON
Commissioner of Patents